June 18, 1946.  E. R. PRICE  2,402,344
FLUID PRESSURE SYSTEM
Filed Jan. 24, 1944
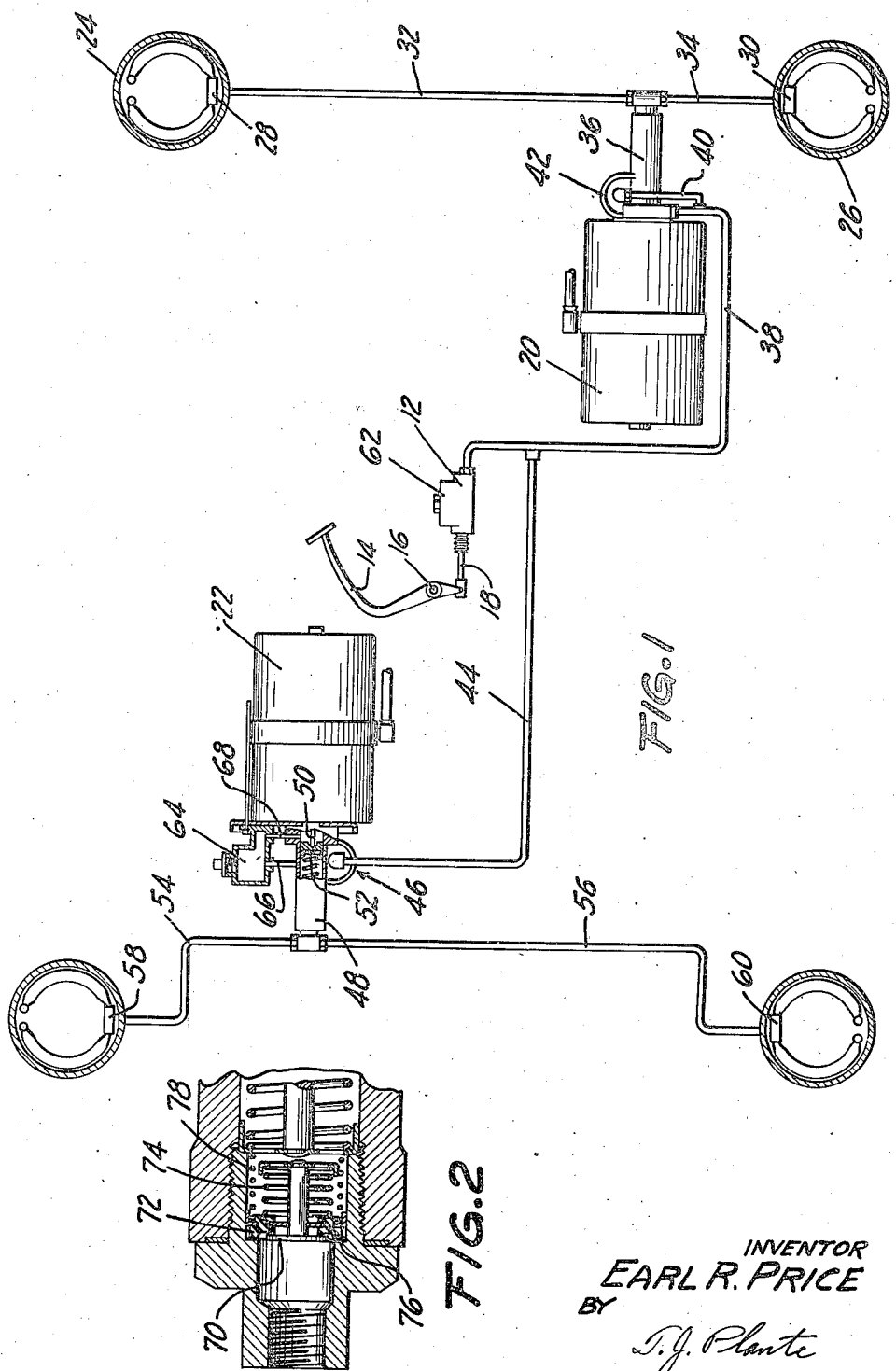
INVENTOR
EARL R. PRICE
BY
T. J. Plante
ATTORNEY Patented June 18, 1946

2,402,344

UNITED STATES PATENT OFFICE 2,402,344

FLUID PRESSURE SYSTEM

Earl R. Price, South Bend, Ind., assignor to Bendix Aviation Corporation, South Bend, Ind., a corporation of Delaware Application January 24, 1944, Serial No. 519,451

5 Claims. (Cl. 188—152)

This invention relates to fluid pressure systems having a hydraulic pressure transmitting portion and power and manual means for exerting pressure on said hydraulic portion. Furthermore, a manually operated master cylinder is adapted to control the operation of said fluid pressure system, the arrangement being akin to that shown in my application Serial No. 368,560, filed December 5, 1940, now Patent No. 2,353,755, July 18, 1944.

If the brake, or clutch, or the like, which is to be actuated by a fluid pressure system as described above, is intended for especially heavy duty, the displacement of the ordinary manually operated master cylinder may be insufficient to operate that portion of the hydraulic system which actually does the work, since the power device or power cylinder as it operates increases the volume which must be kept filled with hydraulic fluid by the manually operated master cylinder. The arrangement of the system might be such that increasing intensity of operation of the power device would not require an increasing volume of hydraulic fluid from the manually operated master cylinder, but in that case, it would not be possible for the operator to judge the extent of brake application by the distance through which he had to move the manually operated pedal or the like. In other words, there would be no provision for "follow-up" in the system.

It is an object of the present invention to provide a system of the type described in the first paragraph of this specification wherein a relatively high displacement power operated hydraulic system may be controlled by a relatively low displacement manually operable master cylinder, without sacrificing "follow-up," or normal pedal movement.

A further object of the present invention is to provide improved means for creating different applying pressures at the front and rear brakes of a vehicle according to a predetermined pressure ratio.

A still further object of the present invention is to better adapt a power braking system for a heavy duty vehicle to the spaces and clearances allowed by the structure of said vehicle for mounting the parts of the power braking system.

Other objects and advantages of the present invention will become apparent during the course of the following description, reference being had therein to the accompanying drawing, wherein:

Fig. 1 is a diagrammatic view of a fluid pressure power braking system incorporating my invention; and Fig. 2 is an enlarged section illustrating a possible arrangement for maintaining a residual pressure in the hydraulic motors of Fig. 1.

Referring to the drawing, a master cylinder 12, preferably of conventional construction, is adapted to serve as the control for the entire fluid pressure system. This master cylinder is intended to be manually operable, and in the illustrated arrangement is actuable by the pedal 14, which is pivoted at 16 and connected to the piston (not shown) of the master cylinder 12 by means of the rod 18.

Instead of utilizing a single extremely large power device or power cylinder, I propose to utilize two or more such power cylinders, indicated generally at 20 and 22. Although the relative location and disposition of the two power cylinders may be varied at will, I have illustrated them in an arrangement which I find particularly useful. The power cylinder 20 is shown operatively connected to the rear brakes of a vehicle, while the power cylinder 22 is shown operatively connected to the front brakes of the same vehicle. This has the advantage that different braking pressures may be applied to the front and rear brakes by utilizing different size power cylinders. In the present illustration the power cylinders have the same capacity, but the applying pressures at the front and rear brakes will differ, for reasons which will be more fully explained below. It would also be possible to use different size power cylinders in any arrangement where, for one reason or another, a greater applying pressure is desired at one work performing device than at another such device.

In the present illustration the rear brakes 24 and 26 are adapted to be applied, respectively, by hydraulic motors 28 and 30. These motors are connected by means of conduits 32 and 34 with a master cylinder 36. The operating pressure of the master cylinder 36 is intended to be created both by power, and manually. It is not necessary that the master cylinder 36, which is actuated both manually and by power, be connected to the rear brakes as illustrated, but it is necessary that at least one master cylinder be incorporated in the system which responds to manual pressure as well as to power. The pressure in the master cylinder 36 is created both by the power cylinder 20 and by the manually created pressure of master cylinder 12, which is hydraulically connected to master cylinder 36 by means of the conduit 38. A branch conduit 40 operatively connects master cylinder 12 to a valve means, indicated generally at 42, which controls operation of the power cylinder 20.

Operation of the power and manually controlled hydraulic system thus far described corresponds to operation of the similar system described in my application Serial No. 368,560, referred to above, and a more complete description may be had by referring to that specification. Briefly, liquid forced from master cylinder 12 by operation of the pedal 14 causes the valve 42 to create a pressure differential over a piston or the like in power cylinder 20. The piston of power cylinder 20 moves to the right causing the piston or plunger in master cylinder 36 to move with it, creating applying pressure in the motors 28 and 30. As the pistons in power cylinder 20 and master cylinder 36 move in the pressure applying direction, additional liquid must be forced from master cylinder 12 to maintain master cylinder 36 filled with liquid. At the same time the force manually created in master cylinder 12 is added to the force of power cylinder 20 in creating pressure in master cylinder 36 and at the motors 28 and 30. Owing to the fact that liquid must be continually displaced from master cylinder 12, the pedal 14 has the normal forward or downward movement during brake application.

A hydraulic conduit 44 connects master cylinder 12 with a valve operating means, indicated generally at 46, which controls operation of power cylinder 22. There is no direct hydraulic connection between master cylinder 12 and master cylinder 48, which is adapted to be operated by power cylinder 22. The only displacement required in master cylinder 12 for the operation of master cylinder 48, is the relatively small displacement necessary to control the valve 46. The hydraulically actuated valve 46, which preferably corresponds to valve 42, in turn causes operation of the power cylinder 22 and the power cylinder 22, acting through rod 50, moves piston 52 forward in master cylinder 48 to force hydraulic fluid under pressure through conduits 54 and 56 to the front wheel brake operating motors 58 and 60, respectively.

It is necessary that both master cylinder 36 and master cylinder 48 be provided with fluid compensating connections, i. e. means whereby losses in fluid or changes in the volume thereof may be neutralized during the time when the master cylinder remains in released position. In the case of master cylinder 36 this compensation is provided by its connection with master cylinder 12, which permits it, as well as master cylinder 12, to communicate with the reservoir 62 associated with said master cylinder 12. Since the master cylinder 48 is not in hydraulic communication with master cylinder 12, separate compensating means must be provided for said master cylinder 48. In the present case, I have illustrated a reservoir 64 located above master cylinder 48 and connected thereto by passages 66 and 68, the passage 68 opening into master cylinder 48 at the rear of piston 52, and the passage 66 opening into master cylinder 48 just ahead of the released position of piston 52. Passage 66 thus provides normal compensation for master cylinder 48, while passage 68 provides a means whereby fluid from reservoir 64 may pass to the chamber at the rear of piston 52 during the operation of said piston in master cylinder 48.

It is preferred that both the hydraulic system actuated by master cylinder 48 and the hydraulic system actuated by master cylinder 36 be provided with means for maintaining a slight residual pressure at all times, in order to effectively maintain the hydraulic seal. Conventional hydraulic systems are provided with residual pressure check valves, which are usually located in the manually controlled master cylinder. In the power operated hydraulic system disclosed in the present application, I prefer to locate residual pressure check valves in the front or left end of master cylinder 48 and in the front or right end of master cylinder 36. Figure 2 is an enlarged cross-section showing a possible construction of the two residual pressure check valves. The check valve arrangement may comprise a poppet 70 which is held seated on a washer 72 by a very light spring 74. The washer 72 is held seated against the flange 76 of the cylinder wall by means of a somewhat heavier spring 78. Liquid under pressure from the bore of the master cylinder, in moving to the motors, lifts poppet 70 from its seat. As liquid returns from the motor or motors to the hydraulic master cylinder, its pressure holds poppet 70 seated on washer 72, and it is necessary for the hydraulic pressure to overcome spring 78 and lift washer 72 from its seat on the wall of the cylinder. A residual pressure will be retained in the motor or motors, therefore, depending upon the strength of the spring 78.

From the above description it will be apparent that the displacement of the master cylinder 12 required to operate both master cylinders 36 and 48 will be approximately equal to the displacement of only one of said operated master cylinders. Furthermore, operation of the entire system will require a movement of pedal 14 proportional to the power being developed, and the operator will thus be apprised of the extent of the brake application. It is intended that a reactionary pressure proportional to the pressure created in master cylinder 36 act in a direction tending to cut off the power of power cylinder 20, and that a reactionary pressure proportional to the pressure created in master cylinder 48 act in a direction tending to cut off the power of power cylinder 22. This may be accomplished by incorporating the usual reactionary diaphragms in the valves 42 and 46. The reactionary pressure also may be provided by the liquid in the motors and connecting lines acting directly against the valve operating hydraulic pressure. With either of these provisions for reaction, the braking force in both parts of the system will at all times be proportional to the manually created pressure in master cylinder 12.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. A pressure creating and transmitting system comprising a first hydraulic motor, a first hydraulic master cylinder in communication with said motor, a first power device adapted to create pressure in said first master cylinder, a second master cylinder which is manually operable and which is in communication with said first master cylinder to add the manually created pressure to that of the power device, valve means responsive to pressure of said second master cylinder and adapted to control said first power device, a second hydraulic motor, a third hydraulic master cylinder in communication with said second motor, a second power device adapted to create the entire operating pressure of said third master cylinder, and valve means responsive to the pressure of said second master cylinder and adapted to control said second power device.

2. A pressure creating and transmitting system comprising a first hydraulic motor, a first hydraulic master cylinder in communication with said motor, a first power device adapted to create pressure in said first master cylinder, a second master cylinder which is manually operable and which is in communication with said first master cylinder to add the manually created pressure to that of the power device, a reservoir associated with said second master cylinder, said first master cylinder being adapted to be compensated for fluid volume variations through said second master cylinder and its reservoir, valve means responsive to the pressure of said second master cylinder and adapted to control said first power device, a second hydraulic motor, a third hydraulic master cylinder in communication with said second motor, a reservoir associated with said third master cylinder and adapted to compensate for fluid volume variations therein, a second power device adapted to create the entire operating pressure of said third master cylinder, and valve means responsive to the pressure of said second master cylinder and adapted to control said second power device.

3. A pressure creating and transmitting system comprising a first hydraulic motor, a first hydraulic master cylinder in communication with said motor, a first power device adapted to create pressure in said first master cylinder, a second master cylinder which is manually operable and which is in communication with said first master cylinder to add the manually created pressure to that of the power device, a reservoir associated with said second master cylinder, said first master cylinder being adapted to be compensated for fluid volume variations through said second master cylinder and its reservoir, valve means responsive to the pressure of said second master cylinder and adapted to control said first power device, a second hydraulic motor, a third hydraulic master cylinder in communication with said second motor, means for compensating for fluid volume variations in said third master cylinder, a second power device adapted to create the entire operating pressure of said third master cylinder, and valve means responsive to the pressure of said second master cylinder and adapted to control said second power device.

4. A braking system for a vehicle having front and rear brakes comprising hydraulic means for actuating said rear brakes, a first hydraulic master cylinder in communication with said hydraulic means, a first power device adapted to create pressure in said first master cylinder, a second master cylinder which is manually operable and which is in communication with said first master cylinder to add the manually created pressure to that of the power device, valve means responsive to the pressure of said second master cylinder and adapted to control said first power device, hydraulic means for actuating said front wheel brakes, a third hydraulic master cylinder in communication with said front wheel hydraulic means, a second power device adapted to create the entire operating pressure of said third master cylinder, and valve means responsive to the pressure of said second master cylinder and adapted to control said second power device.

5. A power operated hydraulic system comprising a first hydraulic master cylinder in communication with a motor, a second hydraulic master cylinder in communication with a motor, a first power device adapted to create pressure in said first master cylinder, a second power device adapted to create pressure in said second master cylinder, a first hydraulically operated valve device arranged to control the operation of said first power device, a second hydraulically operated valve device arranged to control the operation of said second power device, and a third master cylinder which is manually operated and which is connected to both of said hydraulically operated valve devices to actuate the same in accordance with the pressure developed in said third master cylinder, said third master cylinder also being connected to said first master cylinder to add its manually created pressure to that of said first power device in actuating said first master cylinder and also require increased displacement of liquid from said third master cylinder as the displacement from said first master cylinder increases.

EARL R. PRICE.

Certificate of Correction

Patent No. 2,402,644.  June 25, 1946.

CLAUDIUS H. M. ROBERTS

It is hereby certified that errors appear in the printed specification of the above numbered patent requiring correction as follows: Column 5, line 51, after "valved" insert *oil*; column 6, line 9, after the numeral "86" insert *by*; column 15, lines 31 and 32, claim 14, for "restricted orifices" read *agitation zones*; and that the said Letters Patent should be read with these corrections therein that the same may conform to the record of the case in the Patent Office.

Signed and sealed this 12th day of November, A. D. 1946.

[SEAL]

LESLIE FRAZER,
*First Assistant Commissioner of Patents.*